(12) United States Patent
Kim et al.

(10) Patent No.: US 8,551,899 B2
(45) Date of Patent: Oct. 8, 2013

(54) DARK NEUTRAL GREEN GRAY SODA-LIME GLASS COMPOSITION

(75) Inventors: Yong Yi Kim, Yeoju-gun (KR); Si Moo Lee, Yeoju-gun (KR); Seon Jin Kim, Yeoju-gun (KR); Jin Hyuk Lee, Yeoju-gun (KR)

(73) Assignee: KCC Corporation, Seoul (KR)

( * ) Notice: Subject to any disclaimer, the term of this patent is extended or adjusted under 35 U.S.C. 154(b) by 124 days.

(21) Appl. No.: 13/203,039

(22) PCT Filed: Feb. 24, 2010

(86) PCT No.: PCT/KR2010/001142
§ 371 (c)(1),
(2), (4) Date: Aug. 24, 2011

(87) PCT Pub. No.: WO2010/098576
PCT Pub. Date: Sep. 2, 2010

(65) Prior Publication Data
US 2012/0058879 A1    Mar. 8, 2012

(30) Foreign Application Priority Data
Feb. 24, 2009   (KR) .................. 10-2009-0015456

(51) Int. Cl.
*C03C 3/087*   (2006.01)
*C03C 3/095*   (2006.01)

(52) U.S. Cl.
USPC ............................................. 501/71; 501/64

(58) Field of Classification Search
USPC ................................. 501/64, 70, 71
See application file for complete search history.

(56) References Cited

U.S. PATENT DOCUMENTS

| | | |
|---|---|---|
| 4,873,206 A | 10/1989 | Jones |
| 5,308,805 A | 5/1994 | Baker et al. |
| 5,352,640 A | 10/1994 | Combes et al. |
| 5,393,593 A | 2/1995 | Gulotta et al. |
| 5,877,102 A * | 3/1999 | DuPont et al. ............. 501/71 |
| 6,333,287 B1 * | 12/2001 | Seto ............................. 501/70 |
| 6,395,660 B1 * | 5/2002 | Seto et al. ................... 501/71 |
| 6,413,893 B1 | 7/2002 | Shelestak et al. |
| 6,506,700 B1 * | 1/2003 | Combes et al. ............ 501/70 |
| 6,632,760 B2 * | 10/2003 | Boulos et al. .............. 501/71 |

FOREIGN PATENT DOCUMENTS

| | | |
|---|---|---|
| KR | 10-1994-0002025 | 3/1994 |
| KR | 10-0241647 | 2/2000 |
| KR | 10-2001-0041907 | 5/2001 |
| KR | 10-0295379 | 9/2001 |
| KR | 10-0446029 | 11/2004 |
| KR | 10-2008-0080615 | 9/2008 |
| WO | WO 94/25408 | 11/1994 |
| WO | WO 96/28394 | 9/1996 |
| WO | WO 99/47463 | 9/1999 |
| WO | WO 2007/065910 | 6/2007 |

OTHER PUBLICATIONS

PCT/KR2010/001142 International Search Report mailed Oct. 4, 2010, 5 pages.

* cited by examiner

*Primary Examiner* — Karl Group
*Assistant Examiner* — Elizabeth A Bolden
(74) *Attorney, Agent, or Firm* — Dan Cleveland, Jr.; Lathrop & Gage LLP

(57) ABSTRACT

The present invention relates to a dark neutral green gray soda-lime glass composition comprising, as a colorant ingredient per 100 weight parts of a base glass composition, 1.4 to 2.5 weight parts of total $Fe_2O_3$, 0.02 to 0.04 weight parts of CoO, 0.0001 to 0.004 weight parts of Se, 0.005 to 0.5 weight parts of $MnO_2$, and 0.05 to 1 weight parts of $CeO_2$. The glass composition of the present invention has a visible light transmittance ($LT_A$) of 15% or less, an ultraviolet ray transmittance ($T_{uv}$) of 0 to 1%, and a solar transmittance ($T_{sol}$) of 15% or less, measured for a reference thickness of 4 mm. As described above, the glass composition of the present invention is excellent in absorbing ultraviolet rays and solar heat, and therefore can be valuably used in privacy glass or a sunroof of a motor vehicle, or in glass used for construction.

4 Claims, No Drawings

DARK NEUTRAL GREEN GRAY SODA-LIME GLASS COMPOSITION

TECHNICAL FIELD

The present invention relates to a dark, neutral green-gray soda-lime glass composition comprising, as a colorant ingredient per 100 parts by weight of a base glass composition, 1.4 to 2.5 parts by weight of total $Fe_2O_3$, 0.02 to 0.04 parts by weight of CoO, 0.0001 to 0.004 parts by weight of Se, 0.005 to 0.5 parts by weight of $MnO_2$, and 0.05 to 1 parts by weight of $CeO_2$. The glass composition of the present invention has a visible light transmittance ($LT_A$) of 15% or less, an ultraviolet ray transmittance ($T_{uv}$) of 0 to 1%, and a solar transmittance ($T_{sol}$) of 15% or less, measured for a reference thickness of 4 mm. As described above, the glass composition of the present invention is excellent in absorbing ultraviolet rays and solar heat, and therefore can be valuably used in privacy glass or the sunroof of a motor vehicle, or in glass used for construction.

BACKGROUND ART

In comparison with general soda-lime glasses, a colored glass can lower the visibility in motor vehicles because of its low visible light transmittance (LTa) and has a function of reducing heat absorption into motor vehicles because of its low solar transmittance ($T_{sol}$). In addition, since it has a low ultraviolet ray transmittance ($T_{uv}$), the damage to fabrics and the discoloration or decomposition of articles inside motor vehicles due to ultraviolet rays can be prevented.

Various elements can be incorporated in a colored glass in order to improve the glass color, UV-blocking effect, and solar ray absorption effect. The representative elements used in a colored glass include iron (Fe), cobalt (Co) and selenium (Se), and manganese (Mn), nickel (Ni), copper (Cu), chrome (Cr), titanium (Ti) or cerium (Ce) may be further used. Each of these elements has unique coloring effects, and absorption characteristics of ultraviolet rays and solar rays. Such characteristics result from the phenomenon that each element absorbs its specific wavelength. Accordingly, the desired color and transmittance may be designed through the combination of added elements in appropriate ratios.

By properly adjusting various elements as explained above, it is possible to prepare a neutral gray or dark, neutral green-gray glass having aesthetic merit, and function of absorbing ultraviolet rays and solar rays. Various compositions of such gray soda-lime glass have been known and can be divided into two groups, in which one group is prepared by using Fe, Co, and Se as basic elements for coloring while the other group uses additional elements.

In a process for preparing a colored glass, after raw materials are fed into a smelting furnace at high temperature, chemical reactions between the raw materials and decompositions thereof occurs. At the initial stage, the reactions take place in half or less of a continuous-type smelting furnace and in the other part, the fining or refining procedure of bubbles and cooling procedure to a temperature for molding glass melt are conducted. In the fining or refining procedure of bubbles, the bubbles generated in a glass-melting procedure move up to the surface and pop, or they are reabsorbed in glass. The effect depends upon the atmosphere, melting temperature and time in the glass and smelting furnace, and the type and amount of refining agent used. The number of bubbles remaining in the glass is a quality item that is strictly controlled in manufacturing all glass products such as plate glass, glass bottles, etc.

To obtain a proper level of remaining bubbles (i.e., a proper melting quality), a proper length of smelting furnace and proper melting time are needed. In terms of the raw material, it is necessary to use a refining agent such as sodium sulfate ($Na_2SO_4$) in a sufficient amount. Sodium sulfate ($Na_2SO_4$) decomposes and produces a large amount of gas in glass, which grows fine bubbles and accelerates the fining or refining procedure for moving them up to the surface. It is also helpful in homogenizing the glass. However, in decomposition and gasification, sodium sulfate ($Na_2SO_4$) unfortunately generates a large amount sulfur oxides (SOx) which are air pollution materials, and the generated vapor of sulfuric acid and fine powder of sodium sulfate cause serious damage to the refractory materials constituting a heat-condensing chamber of the smelting furnace. Thus, various methods have been tried to reduce the generation of sulfur oxides but no satisfactory results have been obtained. Particularly, no method for reducing sulfur oxide generation that is properly applicable in manufacturing a dark, neutral gray and green-gray glass has yet been known.

U.S. Pat. No. 4,873,206 discloses a glass composition comprising, per 100 parts by weight of a base glass composition, 0.6 to 1.0 parts by weight of total $Fe_2O_3$, 100 to 200 ppm of CoO and 50 to 200 ppm of Se, and not containing Ni or Cr. However, this composition has a visible light transmittance (LTa) of about 25 to 30% as measured for a reference thickness of 4 mm and thus is not suitable for providing a function of privacy protection which is one of the important functions required for the sunroof or rear privacy glass of motor vehicles. Furthermore, from the above composition, it is difficult to expect the advantage of reducing sulfur oxide generation according to the reduction of the amount of sodium sulfate ($Na_2SO_4$) used in the glass manufacturing.

Korean Patent Laid-open Publication No. 1992-0007944 (U.S. Pat. No. 5,393,593) discloses a glass composition comprising, per 100 parts by weight of a base glass composition, 1.0 to 1.7 parts by weight of total $Fe_2O_3$, 100 to 200 ppm of CoO and 10 to 50 ppm of Se. However, since this composition has a visible light transmittance (LTa) of about 13 to 27% and an ultraviolet ray transmittance of 2 to 19%, it is not suitable for providing a function of privacy protection which is one of the important functions required for sunroof or rear privacy glass of motor vehicles, and has a defect of low performance in the function of preventing the damage to fabrics and the discoloration or decomposition of articles inside motor vehicles due to its high ultraviolet ray transmittance. Furthermore, from this composition, it is difficult to expect the advantage of reducing sulfur oxide (SOx) generation according to the reduction of the amount of sodium sulfate ($Na_2SO_4$) used in the glass manufacturing.

Korean Patent Publication No. 10-0227250 (U.S. Pat. No. 5,352,640) discloses a glass composition comprising, per 100 parts by weight of a base glass composition, 1.4 to 4 parts by weight of total $Fe_2O_3$, CoO≥200 ppm, Se≤50 ppm, and CoO+Se+$Cr_2O_3$≤0.24 parts by weight. However, Cr in this composition is known as a poorly soluble material, and as its amount increases, non-molten materials are generated and non-uniform color may be caused thereby. Furthermore, Cr is known as a representative green colorant and thus a dark green color is provided by using a very small amount thereof. Accordingly, if this element is used, there is a difficulty in production of glass with high color uniformity. In addition, because of its high ultraviolet ray transmittance, this composition has a defect of low performance in the function, which is required for sunroof or rear privacy glass of motor vehicles, in preventing the damage to fabrics and discoloration or decomposition of articles inside motor vehicles due to ultraviolet rays.

Furthermore, from this composition, it is difficult to expect the advantage of reducing sulfur oxide (SOx) generation according to the reduction of the amount of sodium sulfate ($Na_2SO_4$) used in the glass manufacturing.

Korean Patent Publication No. 10-0295379 (U.S. Pat. No. 5,308,805) discloses a glass composition comprising, per 100 parts by weight of a base glass composition, 1.3 to 2 parts by weight of total $Fe_2O_3$, 200 to 400 ppm of CoO and 2 to 30 ppm of Se, and containing Ni. In case of containing Ni, it may exist as NiS in the glass-melting procedure and NiS is known to cause glass breakage by volume expansion in the glass-tempering procedure. A dark, neutral green-gray soda-lime glass may be used for motor vehicles and a glass for motor vehicles must be tempered. Therefore, the use of Ni may cause a problem of faulty product increase due to glass breakage. Furthermore, from this composition, it is difficult to expect the advantage of reducing sulfur oxide (SOx) generation according to the reduction of the amount of sodium sulfate ($Na_2SO_4$) used in the glass manufacturing.

CONTENTS OF THE INVENTION

Problems to be Solved

To resolve the problems of prior arts as explained above, the present invention has an object of providing a dark, neutral green-gray soda-lime glass composition even without using colorants such as Ni or Cr unlike prior arts, the composition satisfying a privacy protection performance by effectively controlling the increase of visible light transmittance (LTa), protecting persons and interior articles in motor vehicles and construction by reducing solar transmittance ($T_{sol}$) and particularly lowering ultraviolet ray transmittance to a large extent, and achieving a high product quality regarding bubbles. This is done in an eco-friendly manner by ameliorating the conventional problem of sulfur oxide (SOx) generation according to the use of a large amount of sodium sulfate ($Na_2SO_4$).

Technical Means

To achieve the object as explained above, the present invention provides a dark, neutral green-gray soda-lime glass composition comprising, as a colorant ingredient per 100 parts by weight of a base glass composition, 1.4 to 2.5 parts by weight of total $Fe_2O_3$, 0.02 to 0.04 parts by weight of CoO, 0.0001 to 0.004 parts by weight of Se, 0.005 to 0.5 parts by weight of $MnO_2$, and 0.05 to 1 parts by weight of $CeO_2$.

Effect of the Invention

According to the present invention, it is possible to produce a dark, neutral green-gray soda-lime glass composition, which has a low visible light transmittance and absorbs ultraviolet rays and solar rays excellently and thus can be suitably used in privacy glass or sunroof of motor vehicles, construction glass and the like, without using a large amount of sodium sulfate ($Na_2SO_4$) unlike prior arts. Accordingly, the conventional problem of sulfur oxide (SOx) generation according to the use of sodium sulfate ($Na_2SO_4$) can be ameliorated in an eco-friendly manner, and at the same time a high melting quality (i.e., suppression of bubble defect) can be achieved.

CONCRETE EXPLANATION TO CARRY OUT THE INVENTION

The colorants used in the glass composition of the present invention are concretely explained hereinafter.

Iron (Fe) may be contained in main/additional raw materials as an impurity, and in conventional commercial productions it may exist in the glass in an amount of 0.1 to 0.2% by weight even without further incorporation. In mostly colored glasses, iron is further incorporated to adjust the transmittance and color as desired. As the incorporated raw material, ferric oxide ($Fe_2O_3$) is used. Ferric oxide incorporated during the glass-melting procedure may exist as $Fe^{3+}$ and $Fe^{2+}$. $Fe^{3+}$ ion shows weak absorption in the visible light region of 410 to 440 nm and strong absorption in the ultraviolet region with a center at 380 nm. By these characteristics, if $Fe^{3+}$ exists in a large amount, the glass becomes pale yellow. Meanwhile, since $Fe^{2+}$ ion shows strong absorption with a center at 1050 nm, it is known to be absorbing infrared rays. As the amount of $Fe^{2+}$ increases, the glass color changes to blue. Although the content ratio between $Fe^{2+}$ and $Fe^{3+}$ in $Fe_2O_3$ may vary according to the production process, the content of $Fe^{2+}$ (FeO) in the total amount of iron is controlled in a level of 10 to 30%, and usually 20% in production.

In the glass composition of the present invention, the amount of total $Fe_2O_3$ is 1.4 to 2.5 parts by weight per 100 parts by weight of a base glass composition. If this amount is less than 1.4 parts by weight, the visible light transmittance (LTa) increases, resulting in a reduction in the function of privacy protection which is one of the most important characteristics of a dark, neutral green-gray soda-lime glass composition. If the amount is greater than 2.5 parts by weight, the visible light transmittance (LTa) decreases to a large extent, by which it is difficult to use it as windows for motor vehicles and construction glass due to the extremely low visible light transmittance (LTa), and the content of $Fe^{2+}$ absorbing radiant infrared rays increases inevitably and the temperature in the bottom part of the smelting furnace becomes lower during the melting procedure, causing the problem of melt load increase. To reduce the melt load and obtain a composition with a visible light transmittance (LTa) suitable for privacy protection, the amount of total $Fe_2O_3$ is preferably 1.6 to 2.0 parts by weight, and more preferably 1.7 to 1.9 parts by weight.

In addition, the content of $Fe^{2+}$ (FeO) (Redox: FeO/Total $Fe_2O_3$) is preferably 10 to 30% of total $Fe_2O_3$. If the content of $Fe^{2+}$ is less than 10% of total $Fe_2O_3$, the probability of an increase in visible light transmittance (LTa) and Se oxidation becomes high and thus Se coloration may be lowered. If the content is greater than 30%, the bubble-removal effect of refining agent which is sodium sulfate ($Na_2SO_4$) may be reduced and the volatized amount of Se may increase, resulting in a problem of the failure to maintain an appropriate amount of Se in glass. In addition, there may be a problem of a decrease in heat conductivity during the melting procedure according to the increase of $Fe^{2+}$, and the temperature decrease in the bottom part during the melting procedure and product quality lowering may result. In order to have suitable Se coloration and reduction of the heat-conductivity problem, the content of $Fe^{2+}$ is more preferably 15 to 27%, most preferably 18 to 24%, of total $Fe_2O_3$.

Cobalt (Co) is fed to a batch in the form of cobalt oxide. When existing in $Co^{2+}$ form, it shows absorption at around 530, 590 and 645 nm. By the effect of such absorption, cobalt makes the glass a strong blue color.

In the glass composition of the present invention, the amount of CoO is 0.02 to 0.04 parts by weight per 100 parts by weight of a base glass composition.

If the amount of CoO is less than 0.02 parts by weight, it is insufficient to decolorize the pink of Se, the red-brown of Fe—Se (poly-iron selenide) and the red/purple of $Mn^{3+}$. If the amount is greater than 0.04 parts by weight, the glass becomes too blue, and in order to change it to a dark, green-gray color, it is necessary to increase the Se amount. In this case, the production cost increases according to the increased amount of expensive Se. In order to suppress the visible light transmittance (LTa) effectively and adjust the blue tone with balance, it is more preferable to control the amount of CoO in the range of 0.025 to 0.035 parts by weight. The most preferable amount of CoO is 0.027 to 0.03 parts by weight.

Selenium (Se) shows different coloring behaviors according to its state of oxidation/reduction in glass. When it exists as Se element and in a combination form of FeSe, it shows absorption at 480 to 490 nm. In this case, it is known to colorize the glass to brown/red.

In the glass composition of the present invention, the amount of Se is 0.0001 to 0.004 parts by weight per 100 parts by weight of a base glass composition. If the amount is less than 0.0001 parts by weight, the glass has a strong blue color tone. If the amount is greater than 0.004 parts by weight, the glass has a bronze-like color. In both cases, it may not be possible to maintain the dark, neutral green-gray color and suitable visible light transmittance (LTa) for privacy glass. In order to maintain the color tone and suitable visible light transmittance (LTa), the amount of Se is more preferably 0.001 to 0.004 parts by weight, and most preferably 0.002 to 0.003 parts by weight.

Manganese compound such as manganese dioxide ($MnO_2$) exists in glass in the states of $Mn^{+2}$ and $Mn^{+3}$. It may also exist in the state of $Mn^{+4}$, but only $Mn^{+3}$ provides purple color. Since manganese dioxide ($MnO_2$) absorbs light in the same wavelength region as selenium (Se), it can be used effectively for replacing selenium (Se). Because manganese dioxide ($MnO_2$) is cheaper than selenium and does not volatilize, unlike selenium, it is a suitable colorant for preparing gray and green-gray glass compositions. In addition, manganese dioxide is an effective ultraviolet ray absorber.

Since a high melting temperature suppresses $Mn^{+3}$ and moves the equilibrium of $Mn^{+2}/Mn^{+3}$ in the direction of $Mn^{+2}$, the melting temperature should be controlled properly. Furthermore, the equilibrium of $Mn^{+2}/Mn^{+3}$ is largely affected by the partial pressure of oxygen in the glass melt. For the replacement of the use of selenium (Se) in gray and dark, neutral green-gray glasses, a higher ratio of $Mn^{+3}$ as the state of manganese existing in the glass is more effective. In light of this, the melting should be conducted in an oxidative manner and thus it is essential to include nitrates such as sodium nitrate ($Na_2NO_3$) in the raw materials. Furthermore, if a reducing material such as $As_2O_3$ or $Sb_2O_3$ exists in the batch, the purple color disappears. Accordingly, the $As_2O_3$ and $Sb_2O_3$ ingredients should be removed from the batch.

The glass containing manganese oxide easily melts in the furnace. Both $Mn^{+2}/Mn^{+3}$ pass most of the long-wavelength heat radiation and are heated uniformly in the thickness direction. Manganese dioxide ($MnO_2$) decomposes at 530° C. to generate oxygen. Since the freely generated oxygen acts as a refining agent during the refining procedure of bubbles in the glass, particularly the primary refining procedure, it is effective in preparing glass products of high quality. Furthermore, because it can replace the conventional refining agent, sodium sulfate ($Na_2SO_4$), it is possible to reduce sulfur oxide (SOx) generation due to the decomposition of sodium sulfate ($Na_2SO_4$). Thus, the preparation of high-quality glass and such preparation in an eco-friendly manner can be achieved at the same time.

In the glass composition of the present invention, the amount of manganese dioxide ($MnO_2$) is 0.005 to 0.5 parts by weight per 100 parts by weight of a base glass composition. If the amount is less than 0.005 parts by weight, the absorption effect of ultraviolet rays, the purple coloration effect as a replacement of selenium (Se) and refinement effect are not sufficient. If the amount is greater than 0.5 parts by weight, the purple coloration becomes excessive and thus a dark, neutral green-gray glass is not obtained, and the excessively generated oxygen at high temperature produces too many bubbles, resulting in an adverse effect on glass quality. In dark, neutral green-gray glass production, for proper purple coloration with replacing selenium (Se) and efficient refining effect of bubbles in glass during the melting procedure, the more preferable amount of manganese dioxide ($MnO_2$) is 0.01 to 0.4 parts by weight and the most preferable amount is 0.015 to 0.3 parts by weight.

Cerium dioxide ($CeO_2$) exists in glass in the forms of $CeO_2$ and $Ce_2O_3$. Since it absorbs ultraviolet rays, it is an effective ingredient for blocking ultraviolet rays from external environment. The practical ratio of $CeO_2$ and $Ce_2O_3$ in glass depends upon the amount of $SO_3$ in the glass. $CeO_2$ decomposes at 1400° C. to generate $CeO_2$ and $O_2$. Since the freely generated oxygen acts as a refining agent during the refining procedure of bubbles in the glass, particularly the secondary refining procedure at high temperature, it is effective to prepare high-quality glass products. However, the action of cerium dioxide ($CeO_2$) as a refining agent is dependent upon temperature, and the temperature of 1400° C. is required for perfect refining. Thus, cerium dioxide ($CeO_2$) should be used together with a conventional refining agent such as sodium sulfate ($Na_2SO_4$), and in such cases cerium dioxide can promote the effect of the conventional refining agent or partially replace it. Accordingly, if cerium dioxide is used the use amount of the conventional refining agent, sodium sulfate ($Na_2SO_4$), for soda-lime glass can be reduced. This allows a reduction of sulfur oxide (SOx) generation due to the decomposition of sodium sulfate ($Na_2SO_4$). Thus, the preparation of high-quality glass and such preparation in an eco-friendly manner can be achieved at the same time.

In the glass composition of the present invention, the amount of cerium dioxide ($CeO_2$) is 0.05 to 1 parts by weight per 100 parts by weight of a base glass composition. Ultraviolet rays cause the discoloration of interior articles of motor vehicles and construction. If the amount of cerium dioxide ($CeO_2$) is less than 0.05 parts by weight, it is difficult to decrease extremely the ultraviolet ray transmittance ($T_{uv}$) close to 0. In contrast, if the amount is greater than 1 part by weight, the excessively generated oxygen at high temperature gives an adverse effect to glass quality. In order to have extremely low ultraviolet ray transmittance and efficient refining effect of bubbles in glass during the melting procedure, the more preferable amount of cerium dioxide ($CeO_2$) is 0.2 to 0.9 parts by weight and the most preferable amount is 0.3 to 0.8 parts by weight.

Each of the aforesaid colorant ingredients are used in the amount range as described above per 100 parts by weight of a base glass composition. The base glass composition preferably comprises the following composition as the main components. However, the components are not limited thereto.

TABLE 1

| Components | Amount (weight %) |
| --- | --- |
| $SiO_2$ | 65 to 75 |
| $Al_2O_3$ | 0.3 to 3 |
| $Na_2O + K_2O$ | 10 to 18 |
| CaO | 5 to 15 |
| MgO | 1 to 7 |

$SiO_2$ acts as a network-forming agent to form a basic structure of glass. If its amount is less than 65% by weight, there may be a problem in the durability of glass. If its amount is greater than 75% by weight, the high-temperature viscosity may increase and the meltability may be lowered.

$Al_2O_3$ increases the high-temperature viscosity of glass and can improve the durability of glass when a small amount thereof is added. If its amount is less than 0.3% by weight, the chemical resistance and water resistance may become poor. If its amount is greater than 3% by weight, the melt load may increase together with the increase of high-temperature viscosity.

$Na_2O$ and $K_2O$ are flux agents promoting the melting of raw materials for glass. If the sum of their amounts is less than 10% by weight, the melt quality may be lowered due to the increase of unmelted substances. If the sum of their amounts is greater than 18% by weight, the chemical resistance may be lowered.

CaO and MgO are ingredients that facilitate the melting of raw materials and strengthen the weatherability of glass structure. If the amount of CaO is less than 5% by weight, the durability may be lowered. If the amount of CaO is greater than 15% by weight, due to the tendency for an increase of crystallization there may be an adverse effect on product quality. If the amount of MgO is less than 1% by weight, the intended effect as above may be reduced. If the amount of MgO is greater than 7% by weight, the increase of crystallization tendency may cause an increase of crystal defects.

In a practical production, sodium sulfate ($Na_2SO_4$) may be used for melt quality improvement such as the removal of bubbles. Its amount existing in glass as $SO_3$ gas form is generally controlled in the range of 0.01 to 1.0% by weight during the melting procedure. The removal of bubbles for improving melt quality is carried out through the refining procedure of the gas generated during the glass melting procedure. In a general soda-lime glass production, the gases generated for removing bubbles are mainly $SO_2$ and $O_2$, and additionally $CO_2$, CO, $H_2O$, etc. The gas-generating source may be grouped into sulfates such as sodium sulfate ($Na_2SO_4$) and other refining materials.

The bubble removal action of sodium sulfate ($Na_2SO_4$) is basically divided into primary fining and secondary fining or refining, reactions of which are respectively as follows:

Primary Fining: Reaction of Carbon (C) and Sodium Sulfate ($Na_2SO_4$)

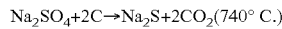
$Na_2SO_4 + 2C \rightarrow Na_2S + 2CO_2 (740°C.)$

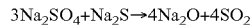
$3Na_2SO_4 + Na_2S \rightarrow 4Na_2O + 4SO_2$

Secondary Fining or Refining:

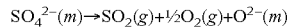
$SO_4^{2-}(m) \rightarrow SO_2(g) + \frac{1}{2}O_2(g) + O^{2-}(m)$

In addition, sodium sulfate ($Na_2SO_4$) is essential for producing general soda-lime glass because it has the advantage of reducing the melt load and time by the action of promoting decomposition of $SiO_2$ provided from silica as follows, and inhibiting the generation of defects due to unmelted silica.

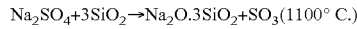
$Na_2SO_4 + 3SiO_2 \rightarrow Na_2O \cdot 3SiO_2 + SO_3 (1100°C.)$

However, despite the merits explained above, the use amount of sodium sulfate ($Na_2SO_4$) is restrictive because of the generation of sulfur oxides (SOx, an environment-polluting substance) such as $SO_2$ according to its decomposition. $SO_2$ is a representative air-polluting substance with high toxicity and a material causing acid rain, and thus its discharge is regulated in most countries. Therefore, it is necessary to use an alternative refining agent that does not contain sulfur in order to obtain better melt quality or reduce sulfur oxide generation according to the use of sodium sulfate ($Na_2SO_4$).

In the present invention, such purposes are achieved by using manganese dioxide ($MnO_2$) and cerium dioxide ($CeO_2$) to replace sodium sulfate ($Na_2SO_4$) partly or to provide higher efficiency in bubble removal. These ingredients can be applied selectively to the primary fining and secondary fining or refining actions of sodium sulfate ($Na_2SO_4$), respectively, as follows.

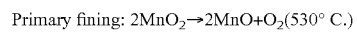
Primary fining: $2MnO_2 \rightarrow 2MnO + O_2 (530°C.)$

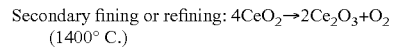
Secondary fining or refining: $4CeO_2 \rightarrow 2Ce_2O_3 + O_2$ (1400° C.)

The dark, neutral green-gray soda-lime glass according to the present invention can be applied as safety glass for motor vehicles. It may also be applied as window glass for construction. In safety glass for motor vehicles, it may be applied as sunroof or privacy glass but the application is not limited thereto. In order for it to be used as window for motor vehicles and construction glass, the dark, neutral green-gray soda-lime glass according to the present invention shows optical characteristics, preferably having a visible light transmittance (LTa) of 15% or less, a solar transmittance ($T_{sol}$) of 15% or less, and an ultraviolet ray transmittance ($T_{uv}$) of 0 to 1%, measured for a reference thickness of 4 mm.

If the visible light transmittance (LTa) exceeds 15% due to a problem in controlling the colorant amount, the applicability of dark, neutral green-gray soda-lime glass as a privacy glass may be limited. This may be a problem in privacy protection which is particularly required in sunroof or privacy glass among safety glass for motor vehicles. Since ultraviolet rays cause aging of interior articles and skin-aging in the human body, its transmittance ($T_{uv}$) is preferably controlled within 0 to 1%, measured for a reference thickness of 4 mm.

In order for suitable use as window for motor vehicles and construction glass, along with the transmittances in said ranges, it is preferable to adjust the glass tone to have a dominant wavelength ($D_w$) of 490 to 560 nm and an excitation purity ($P_e$) of 0.5 to 8%. If the glass tone is not adjusted within these ranges, the glass may be colorized in strong blue and red tones, and it is difficult to maintain dark, neutral green-gray tone.

The present invention is explained in more detail by the following Examples and Comparative Examples. However, these examples seek to illustrate the present invention only, and the scope of the present invention is not limited by them.

EXAMPLES 1 TO 6 AND COMPARATIVE EXAMPLES 1 TO 9

A glass sample for chemical analysis of glass composition and optical property evaluation was prepared by using a Pt-10% Rh crucible in a gas furnace and an electric furnace. The raw material batch as weighed on a 500 g basis was melted in a gas furnace at 1450° C. for 1 hour and subjected to rapid cooling to obtain glass powder. The one-hour melting in a gas furnace at 1450° C. was then repeated two times to prepare a sample with high homogeneity.

In addition, a glass sample for measuring the number of residual bubbles, i.e., evaluating melt quality, was prepared by using a cylindrical alumina crucible with 5 cm diameter and 10 cm height. The same batch as that used in the sample for chemical analysis of glass composition and optical property evaluation was weighed on a 500 g basis. The raw material batch was melted in a gas furnace for 3 hours, and the glass melt was then cooled slowly to room temperature in a slow cooling chamber, as contained in the crucible. The slowly cooled crucible was cut together with the glass by using a cutter, longitudinally with a distance of 2 mm toward both sides from the center, to obtain a glass sample with a thickness of 4 mm. The sample was then immersed in oil having the same refractive index as soda-lime glass, and the number of residual bubbles was measured with an optical microscope. The melt quality was evaluated as the number of residual bubbles per weight of the sample. As the raw materials, silica, feldspar, limestone, dolomite, soda ash, sodium sulfate, iron oxide, cobalt oxide, selenium, manganese oxide, cerium oxide, coke, etc. were used, the formulation was adjusted for the target compositions as described in the Examples/Comparative Examples below to obtain a glass batch, and the batch was melted by using gas furnace/electric furnace. In the glass composition, a soda-lime glass composition comprising, based on weight %, 71.2% of $SiO_2$, 0.95% of $Al_2O_3$, 9.8% of CaO, 3.8% of MgO, 13.9% of $Na_2O$, 0.15% of $K_2O$ and 0.2% of $SO_3$ was used as a base glass composition excluding the colorants.

Per 100 parts by weight of the above base glass composition, the colorants were added with the kinds and amounts described in the Examples/Comparative Examples. After casting-molding of the prepared glass with a graphite plate and processing to a thickness of 4 mm, the properties were evaluated.

The chemical composition analysis of the glass sample was conducted by using 3370 X-ray fluorescence analyzer (XRF) of Rigaku, and the optical characteristics were measured by using the following devices.

Visible light transmittance (LTa): Measured by using HUNTER LAB colorimeter in view of CIE Yxy/2 Figure, 1931 (Standard light A)

Solar transmittance (Tsol) and ultraviolet ray transmittance: Measured by using Cary-500 spectrophotometer of VARIAN according to manufactured KSL 2514 and ISO 9050:1990

Dominant wavelength and excitation purity: Measured by using HUNTER LAB colorimeter in view of CIE Yxy/2 Figure, 1931 (Standard light C)

The base glass composition for each Example/Comparative Example was prepared in the same manner according to the composition of Table 2 below. The kinds and amounts of the colorants, use amount of sodium sulfate ($Na_2SO_4$), melt quality (number of residual bubbles/g) and measured optical property values for each Example/Comparative Example are shown in the following Tables 3, 4 and 5.

TABLE 2

| Base glass composition (weight %) | | |
|---|---|---|
| | $SiO_2$ | 71.2 |
| | $Al_2O_3$ | 0.95 |
| | CaO | 9.8 |
| | MgO | 3.8 |
| | $Na_2O$ | 13.9 |
| | $K_2O$ | 0.15 |
| | $SO_3$ | 0.2 |

TABLE 3

(Per 100 parts by weight of base glass composition)

| Item | Remarks | Example 1 | Example 2 | Example 3 | Example 4 | Example 5 | Example 6 |
|---|---|---|---|---|---|---|---|
| Colorant I composition (parts by weight) | Total $Fe_2O_3$ | 1.45 | 1.80 | 2.20 | 1.80 | 1.80 | 1.90 |
| | $MnO_2$ | 0.4 | 0.1 | 0.008 | 0.01 | 0.2 | 0.3 |
| | $CeO_2$ | 0.9 | 0.53 | 0.1 | 0.15 | 0.53 | 0.5 |
| | FeO | 0.305 | 0.45 | 0.528 | 0.450 | 0.486 | 0.456 |
| Colorant II composition (parts by weight) | CoO | 0.025 | 0.028 | 0.03 | 0.029 | 0.029 | 0.0225 |
| | Se | 0.0012 | 0.0019 | 0.002 | 0.0021 | 0.0023 | 0.0007 |
| Redox | FeO/Total $Fe_2O_3$ | 0.21 | 0.25 | 0.24 | 0.25 | 0.27 | 0.24 |
| Optical properties | $T_{vis}$ | 12.0 | 10.5 | 8.1 | 11.1 | 7.1 | 14.1 |
| | $T_{sol}$ | 12.7 | 8.6 | 7.3 | 8.6 | 8.0 | 8.5 |
| | $T_{uv}$ | 0.1 | 0.4 | 0.3 | 0.6 | 0.3 | 0.4 |
| | $D_w$ | 530 | 510 | 515 | 508 | 535 | 545 |
| | $P_e$ | 2.4 | 2.8 | 2.8 | 3.2 | 2.8 | 3.9 |
| Amount of sodium sulfate | (kg/2000 kg silica) | 18 | 18 | 18 | 18 | 18 | 18 |
| Melt quality | Residual bubbles [number/g] | 0.3 | 0.5 | 1.2 | 1.2 | 0.8 | 0.8 |

TABLE 4

(Per 100 parts by weight of base glass composition)

| Item | Remarks | Comp. Exam. 1 | Comp. Exam. 2 | Comp. Exam. 3 | Comp. Exam. 4 | Comp. Exam. 5 |
|---|---|---|---|---|---|---|
| Colorant I composition (parts by weight) | Total $Fe_2O_3$ | 1.44 | 1.8 | 1.9 | 1.46 | 1.45 |
| | $MnO_2$ | 0 | 0 | 0 | 0 | 0 |
| | $CeO_2$ | 0 | 0 | 0 | 0.9 | 0.9 |
| | FeO | 0.302 | 0.45 | 0.45 | 0.307 | 0.305 |
| Colorant II composition (parts by weight) | CoO | 0.0251 | 0.028 | 0.028 | 0.0251 | 0.025 |
| | Se | 0.0012 | 0.0027 | 0.0019 | 0.0013 | 0.002 |
| Redox | FeO/Total $Fe_2O_3$ | 0.21 | 0.25 | 0.25 | 0.21 | 0.21 |
| Optical properties | $T_{vis}$ | 18.5 | 10.7 | 10.5 | 18.2 | 18.3 |
| | $T_{sol}$ | 12.6 | 8.6 | 8.5 | 12.6 | 12.7 |
| | $T_{uv}$ | 5.5 | 3.6 | 2.4 | 3.2 | 0.5 |
| | $D_w$ | 472 | 508 | 482 | 479 | 521 |
| | $P_e$ | 8.4 | 2.8 | 5.7 | 8.5 | 3.9 |

TABLE 4-continued (Per 100 parts by weight of base glass composition)

| Item | Remarks | Comp. Exam. 1 | Comp. Exam. 2 | Comp. Exam. 3 | Comp. Exam. 4 | Comp. Exam. 5 |
|---|---|---|---|---|---|---|
| Amount of sodium sulfate | (kg/2000 kg silica) | 18 | 18 | 26 | 18 | 18 |
| Melt quality | Residual bubbles [number/g] | 2.2 | 2 | 0.5 | 1.7 | 1.71 |

TABLE 5

(Per 100 parts by weight of base glass composition)

| Item | Remarks | Comp. Exam. 6 | Comp. Exam. 7 | Comp. Exam. 8 | Comp. Exam. 9 |
|---|---|---|---|---|---|
| Colorant I composition (parts by weight) | Total $Fe_2O_3$ | 1.8 | 1.45 | 1.8 | 1.8 |
| | $MnO_2$ | 0 | 0.4 | 0.1 | 1 |
| | $CeO_2$ | 0.53 | 0 | 0 | 1.5 |
| | FeO | 0.45 | 0.305 | 0.45 | 0.45 |
| Colorant II composition (parts by weight) | CoO | 0.028 | 0.025 | 0.028 | 0.028 |
| | Se | 0.0019 | 0.0012 | 0.0019 | 0.0019 |
| Redox | FeO/Total $Fe_2O_3$ | 0.27 | 0.21 | 0.27 | 0.27 |
| Optical properties | $T_{vis}$ | 11.9 | 13 | 10.5 | 3 |
| | $T_{sol}$ | 8.6 | 12.7 | 8.6 | 8.1 |
| | $T_{uv}$ | 0.5 | 4.1 | 2.4 | 0.1 |
| | $D_w$ | 483 | 520 | 480 | 605 |
| | $P_e$ | 5.4 | 3.1 | 5.6 | 13 |
| Amount of sodium sulfate | (kg/2000 kg silica) | 18 | 18 | 18 | 18 |
| Melt quality | Residual bubbles [number/g] | 1.65 | 1.82 | 1.85 | 4 |

As can be seen from the above Table 3, the glasses of Examples 1 to 6 satisfied dark, neutral green-gray tone in the dominant wavelength ($D_w$) and excitation purity ($P_e$), and maintained the visible light transmittance (LTa) as 15% or less, by which it is confirmed that the prepared glasses were dark, neutral green-gray glasses having a visible light transmittance (LTa) suitable for use as sunroof and rear privacy glass for motor vehicles.

Comparative Examples 1 to 3 were representative compositions of gray soda-lime glass prepared by the prior art. Comparative Examples 4 to 8 were those not containing either $MnO_2$ or $CeO_2$ unlike the Examples. Comparative Example 9 used $MnO_2$ and $CeO_2$ but their amounts were beyond the composition ranges of the present invention.

Comparative Example 1 had too high visible light transmittance (LTa) and ultraviolet ray transmittance to be used as sunroof and rear privacy glass for motor vehicles for privacy protection, and could not satisfy the dark, neutral green-gray tone in the dominant wavelength ($D_w$). Comparative Example 1 used the same amount of sodium sulfate ($Na_2SO_4$) as Example 1, but since it did not contain $MnO_2$ and $CeO_2$, it showed bad melt quality with residual bubbles seven (7) times higher than Example 1.

Comparative Example 2 had too high ultraviolet ray transmittance to be used as sunroof/rear privacy glass for motor vehicles, and contained Se in an amount 1.4 times greater than Example 2 in order to satisfy the dark, neutral green-gray tone in the dominant wavelength ($D_w$) and excitation purity ($P_e$) similar to Example 2. This means that by using $MnO_2$ as in Example 2, the use amount of Se, which is highly volatile and toxic, can be reduced remarkably. In addition, Comparative Example 2 used the same amount of sodium sulfate ($Na_2SO_4$) as Example 2 but showed bad melt quality with residual bubbles four (4) times higher than Example 2.

Comparative Example 3 had too high ultraviolet ray transmittance to be used as sunroof and rear privacy glass for motor vehicles, and could not satisfy the dark, neutral green-gray tone in the dominant wavelength ($D_w$). Furthermore, in comparison with Example 2 further containing $MnO_2$ and $CeO_2$, Comparative Example 3 shows that it was necessary to use sodium sulfate ($Na_2SO_4$) in an amount 1.4 times greater than Example 2 in order to obtain the same level of melt quality. It is stoichiometrically inevitable that more use of sodium sulfate ($Na_2SO_4$) generates more sulfur oxides (SOx).

In comparison with Example 1, Comparative Examples 4 to 8 used the same levels of sodium sulfate ($Na_2SO_4$), $Fe_2O_3$, CoO and Se. Nevertheless, they showed worse melt qualities. This means that in order to simultaneously improve the melt quality and reduce the generation of the environment-polluting sulfur oxides (SOx), $MnO_2$ and $CeO_2$ should be used in the glass production at the same time.

Comparative Example 9 used $MnO_2$ and $CeO_2$ in amounts exceeding the composition ranges of the present invention. In this case, the number of residual bubbles increased dramatically and the dominant wavelength ($D_w$) and excitation purity ($P_e$) could not satisfy the characteristics of dark, neutral green-gray soda-lime glass. It is understood that this is because excessive $O_2$ was generated when $MnO_2$ and $CeO_2$ decomposed during the glass melting procedure. Furthermore, the use of excessive $MnO_2$ colorizes the glass in a purple tone excessively and thus the glass cannot have the characteristics of dark, neutral green-gray soda-lime glass.

The invention claimed is:

1. A dark, neutral green-gray soda-lime glass composition comprising, as a colorant ingredient per 100 parts by weight of a base glass composition, 1.4 to 2.5 parts by weight of total $Fe_2O_3$, 0.02 to 0.04 parts by weight of CoO, 0.0001 to 0.004 parts by weight of Se, 0.005 to 0.5 parts by weight of $MnO_2$, and 0.05 to 1 parts by weight of $CeO_2$, wherein said dark, neutral green-gray soda-lime glass composition has a visible light transmittance ($LT_A$) of 15% or less, an ultraviolet ray transmittance ($T_{uv}$) of 0 to 1%, and a solar transmittance ($T_{sol}$) of 15% or less, measured for a reference thickness of 4 mm.

2. The dark, neutral green-gray soda-lime glass composition according to claim 1, wherein FeO content in the total $Fe_2O_3$ is 10 to 30% by weight.

3. The dark, neutral green-gray soda-lime glass composition according to claim 1, wherein the base glass composition is a soda-lime glass composition comprising 65 to 75% by weight of $SiO_2$, 0.3 to 3.0% by weight of $Al_2O_3$, 10 to 18% by weight of [$Na_2O+K_2O$], 5 to 15% by weight of CaO and 1 to 7% by weight of MgO.

4. The dark, neutral green-gray soda-lime glass composition according to any one of claims 1 to 3, having a dominant wavelength of 490 to 560 nm and an excitation purity of 0.5 to 8%. excitation purity of 0.5 to 8%.

* * * * *